US012608653B1

(12) United States Patent
Chong et al.

(10) Patent No.: US 12,608,653 B1
(45) Date of Patent: Apr. 21, 2026

(54) WEBSITE STYLE REPLICATOR

(71) Applicant: AppDirect, Inc., San Francisco, CA (US)

(72) Inventors: Colin Chong, Calgary (CA); Cedric Dugas, Montreal (CA); Elias Khalifeh, Montreal (CA); Lenmor Dimanalata, Montreal (CA); Ninad Vartak, Montreal (CA); Dominic Lee, Sunnyvale, CA (US); Son Nguyen, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 534 days.

(21) Appl. No.: 18/187,610

(22) Filed: Mar. 21, 2023

(51) Int. Cl.
| | |
|---|---|
| *G06N 20/00* | (2019.01) |
| *G06N 5/022* | (2023.01) |
| *G06N 99/00* | (2019.01) |

(52) U.S. Cl.
CPC ............. *G06N 20/00* (2019.01); *G06N 5/022* (2013.01)

(58) Field of Classification Search
CPC ........ G06N 20/00; G06N 5/022; G06N 20/10; G06N 20/20; G06N 99/00
USPC ...................... 706/16, 15, 45, 53, 46, 50, 62
See application file for complete search history.

(56) References Cited

U.S. PATENT DOCUMENTS

| | | | | |
|---|---|---|---|---|
| 12,141,219 | B2 * | 11/2024 | Gursha | ............... G06F 16/9566 |
| 12,182,958 | B2 * | 12/2024 | Shayani | .................. G06T 19/20 |
| 2021/0406921 | A1 * | 12/2021 | Mucha | .................... H04L 67/02 |
| 2022/0366131 | A1 * | 11/2022 | Ekron | .................... G06F 9/453 |

* cited by examiner

*Primary Examiner* — Daquan Zhao
(74) *Attorney, Agent, or Firm* — McDermott Will & Schulte LLP

(57) ABSTRACT

Methods, systems, and storage media for replicating a website. The method can include receiving a source website and determining a plurality of source parameters associated with the source website. The method can include extracting the source parameters associated with the source website. The method can comprise determining destination parameters associated with the destination website. The method can also include training a machine learning model. The machine learning model can be trained to determine model parameters associated with the source website. The machine model can also be trained to generate a set of resultant parameters based on a comparison between source parameters and model parameters and match a resultant parameter to an associated destination parameter. The method can comprise replacing the associated destination parameter with the resultant parameter to generate the replicated source website.

20 Claims, 5 Drawing Sheets

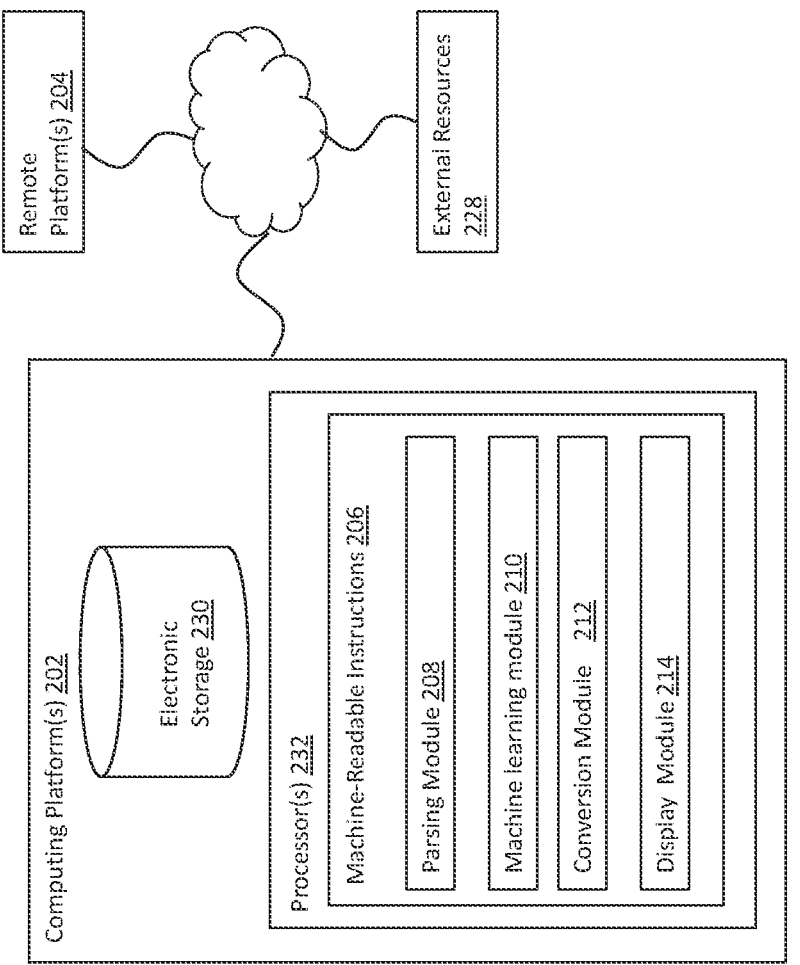
FIG. 2

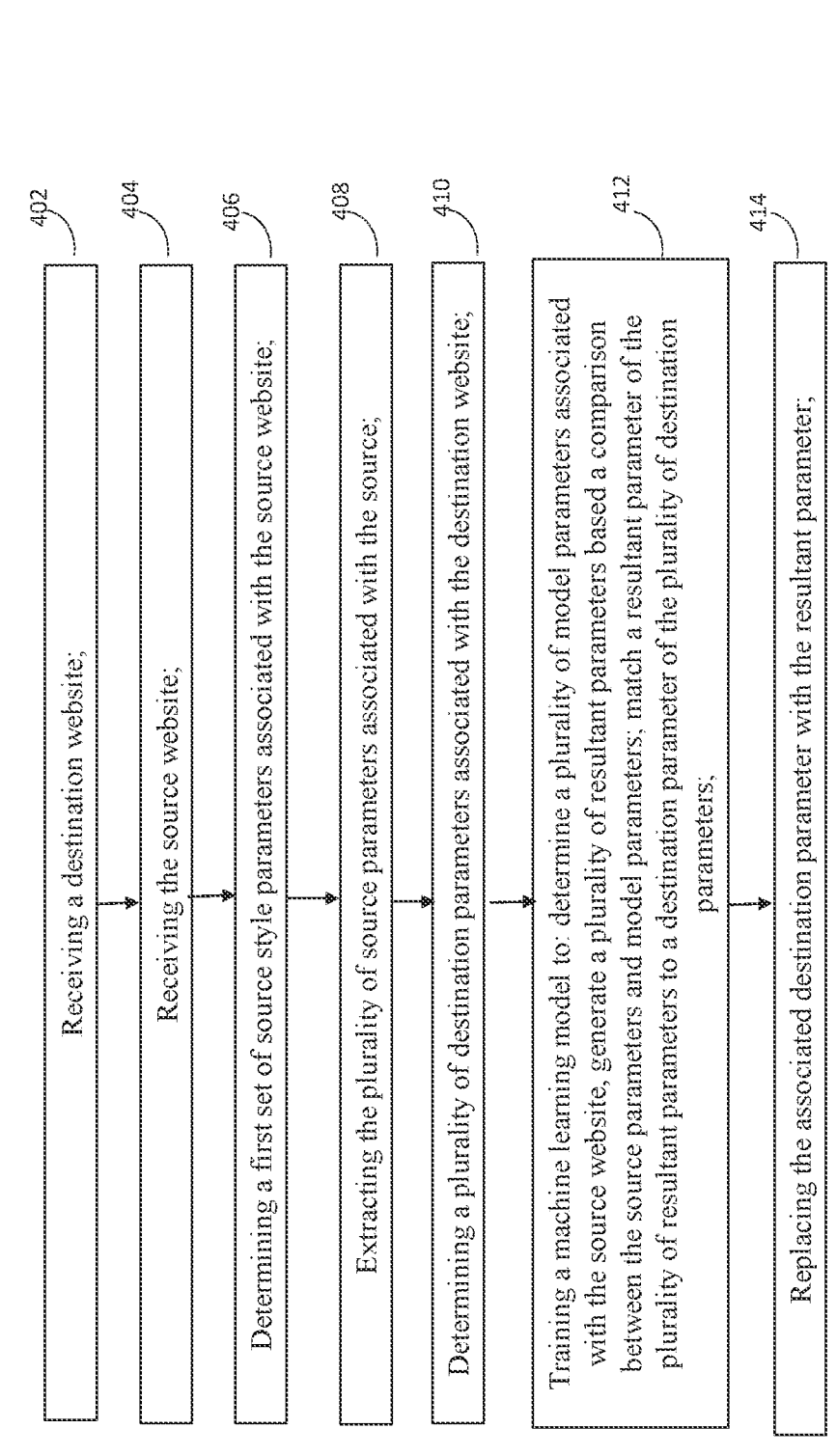

402 — Receiving a destination website;

404 — Receiving the source website;

406 — Determining a first set of source style parameters associated with the source website;

408 — Extracting the plurality of source parameters associated with the source;

410 — Determining a plurality of destination parameters associated with the destination website;

412 — Training a machine learning model to: determine a plurality of model parameters associated with the source website, generate a plurality of resultant parameters based a comparison between the source parameters and model parameters; match a resultant parameter of the plurality of resultant parameters to a destination parameter of the plurality of destination parameters;

414 — Replacing the associated destination parameter with the resultant parameter;

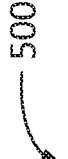
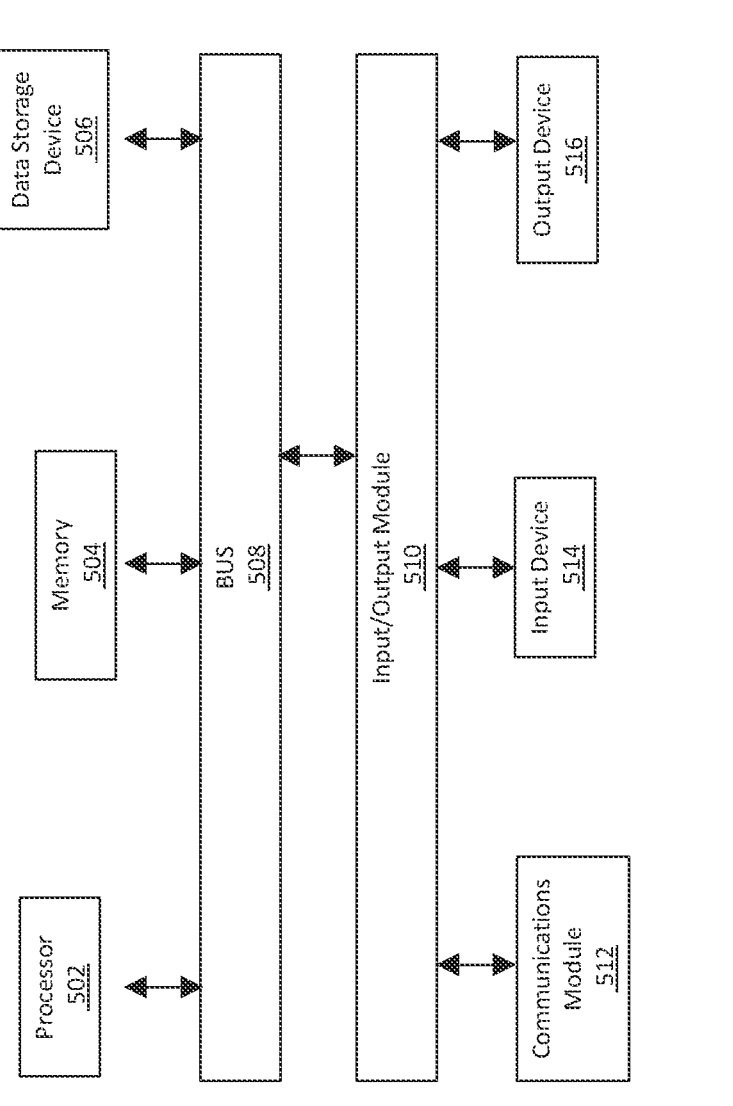
FIG. 5

WEBSITE STYLE REPLICATOR

TECHNICAL FIELD

The present disclosure generally relates to software visual style and format, and more particularly to replicating user interface of a website.

BACKGROUND

Currently, the requirements to replicate styles and formats from one digital interface to another requires a specific translation from one discrete file format to another. Design tools for a digital interface (e.g., website) can create a compatibility issue between two respective websites. For example, the destination interface may operate with different software protocols than the preferred source data/format. Due to the potential incompatibility between the source and target digital interface, the process can require labor intensive efforts and financial costs to replicate the visual style.

BRIEF SUMMARY

The subject disclosure provides for replicating a website. In an e-commerce environment, there is a need for certain efficiencies in establishing a web presence for certain entities. As a part of establishing the web presence, an entity can seek to have their respective website resemble a style of a source website. There can be difficulty in determining the style parameters from the source website that should be transferred/replicated in the destination website. For example, identifiers (tags) that specify text color for two respective websites (e.g., source and destination) may be different. The heuristic approach herein described addresses the ambiguity and incongruence between the website struc-tures by using the modules and machine learning model to define congruency relationships between the parameter and/or parameter structure of two websites. The solution addresses the problem of replicating a source website style by identifying style parameters from the source website and predicting additional style parameters that will increase the likelihood of resemblance between a desired source website and resultant destination website.

One aspect of the present disclosure relates to a method for replicating a website. The method can include receiving a destination website. The method can include receiving a source website. The method can include determining a plurality of source parameters associated with the source website. The method can include extracting the plurality of source parameters associated with the source. The method can comprise determining a plurality of destination param-eters associated with the destination website. The method can also include training a machine learning model. The machine learning model can be trained to determine a plurality of model source parameters associated with the source website. The machine model can also be trained to generate a set of resultant parameters based on a comparison between source parameters and model parameters and match a resultant to an associated destination parameter from the plurality of destination parameters. In response to matching the resultant parameters with the associated destination parameter, the method can comprise replacing the associated destination parameter with the resultant parameter. The method can further comprise receiving supplemental data to update the parameters.

Another aspect of the present disclosure relates to a system configured for replicating a website. The system can comprise one or more hardware processors configured by machine-readable instructions. The system can be config-ured to receive a destination website. The instructions can be configured to receive a source website. The system can be configured to determine a first set of source parameters associated with the source website. The processor and instructions can be configured to identify a primary source data, secondary source data, and tertiary source data from the source website. The system can be configured to deter-mine a plurality of destination parameters associated with the destination website. The processor and instructions can be configured to train a machine learning model. The system can configure the model to predict model parameters asso-ciated with the source website. The system can be config-ured to generate a set of resultant parameters based on a comparison between the source parameters and model parameters. The system can be configured to match a resultant parameter to an associated destination parameter from the plurality of destination style parameters. The system, in response to matching the resultant parameters with the associated destination parameters can be configured to replace the associated destination style parameter with the resultant parameter.

Yet another aspect of the present disclosure relates to a non-transient computer-readable storage medium having instructions embodied thereon, the instructions being executable by one or more processors to perform a method for replicating a website. The method can include receiving a source website. The method can include determining a plurality of source parameters associated with the source website. The method can include extracting the plurality of source parameters associated with the source website. The method can comprise determining a plurality of destination parameters associated with the destination website. The method can also include training a machine model. The machine model can also be trained to generate a set of resultant parameters based on a comparison between source parameters and model parameters and match a style param-eter from the resultant parameter to an associated destination parameter from the plurality of destination parameters. In response to matching the resultant parameters with the associated destination parameter, the method can comprise replacing the associated destination style parameter with the resultant parameter. The method can further comprise receiving supplemental data to update the parameters.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 is a block diagram illustrating an example com-puter system (e.g., representing both client and server) with which aspects of the subject technology can be imple-mented.

FIG. 4 illustrates an example flow diagram for replicating a website, according to certain aspects of the disclosure.

FIG. 5 is a block diagram illustrating an example com-puter system (e.g., representing both client and server) with which aspects of the subject technology can be imple-mented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

A difficulty with replicating the visual display of other websites in that each website may comprise unique components and parameters that are associated with the program used to create the website and the operating system that the website can run from. Thus, there may not be a direct one to one comparison between parameters on two distinct websites. In the attempt to create a similar website in visual appearance, there is a need to define a method that can generate relationships between the parameters of two websites. Those relationships can be used to match analogous parameters between two respective websites. As the two analogous parameters are identified and matched, the parameters of one site can be replaced or adjusted to resemble the collective visual appears of a second site.

Figure 1:
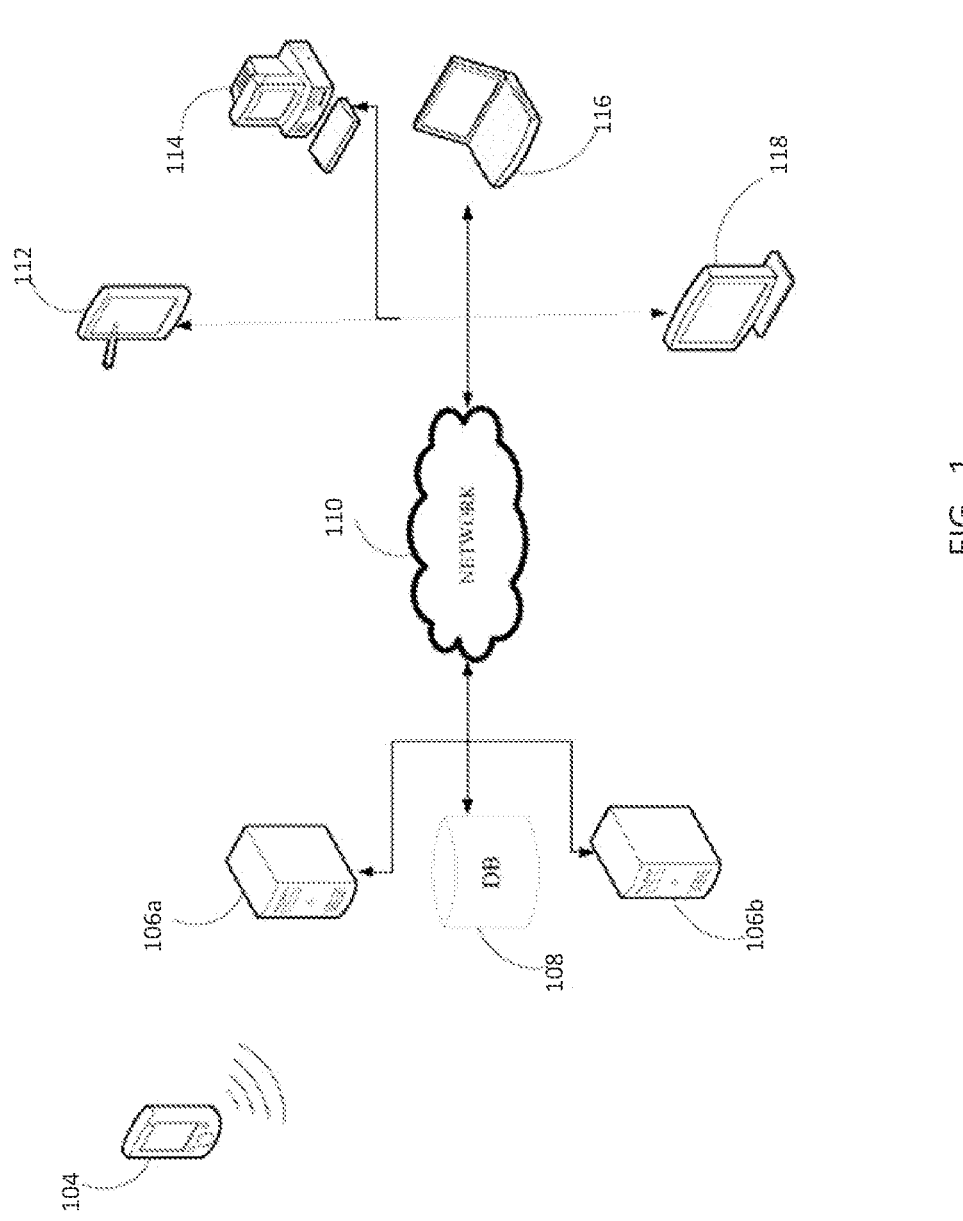
FIG. 1 illustrates an exemplary operating environment for client devices.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server which receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared social media content that can be subscribed to by other users. The database 108 may also be used to facilitate key rotation in a one to many encryption architecture by causing issue of new keys when a copy of a shared key becomes comprised, for example.

FIG. 2 illustrates a system 200 configured for replicating a website, according to certain aspects of the disclosure. In some implementations, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of request parsing module 208, machine learning module 210, conversion module 212, display module 214, and/or other instruction modules.

The parsing module 208 may be configured to receive the destination website into the platform 202. In one aspect, the parsing module 208 can load a copy of the webpages associated with the destination website. The parsing module 208 can be a module that preps the platform to extract parameter data that defines the visual display of the website. The parsing module 408 can also identify the various parameters that define the visual display of the website. In a further aspect, the parsing module 408 can categorize the parameters into primary, secondary and tertiary categories. When replicating a subsequent website, categorizing the parameters can allow the platform to prioritize the parameters that are the most essential in replicating the style and visual appearance of the desired (source) website. For example, primary category of parameters can include: background color, font color, and font style. The secondary category of parameters can include text link color, header color, and the tertiary category of parameters can include button colors and external links. With the coding language used to generate the website, the respective parameters can be parsed by identifiers that signify data in the website's structure and is a parameter that defines a portion of the website's visual display. The parsing module 208 can be used to extract all of the relevant parameters for comparison.

The machine learning module 210 can be used to improve the results from the identification and grouping made by the parsing module. As discussed earlier, there will be differences between the defined parameters and parameter structure used to generate the visual display of the source website. During the process of replicating the source website, a substantial variance or inaccuracy in the resultant destination website can be due to the differences in source parameters and parameter structure with the destination parameters and parameter structure. The machine language module 210 can take repetitive inputs from other comparisons between source websites and destination websites to generate a stronger resemblance between two other respective websites. In one aspect, the machine language module 210 can generate a second set of style parameters associated with the source website. The second set of style parameters can be determined based on stored parameters received from the storage device 230.

In one aspect, the parsing module 208 can determine a set of parameters from the source site and machine learning module 210 determines a second set of parameters from historical data stored from the storage device. In a further aspect, the machine learning model can generate a resultant set of style parameters from a first set of parameters derived from the parsing module 208 and a second set of parameters derived from historical data fed into the model. Further, the resultant set of style parameters can be the most likely representation of parameters from the source website.

In one aspect, the machine learning module can coordinate with the parsing module to identify whether the correct parameter has been identified. For example, if the text color has been identified as a primary category for a source website, the machine learning module may inform the parsing module to identify and extract additional metadata associated with the parameter to increase the likelihood that the extracted text data and metadata will yield the desired visual result when displayed in the destination website. Depending on the parameter structure of the source website, adjustments in category hierarchy may be necessary to achieve the desired visual result. For example, the machine module may cause the parsing module to alter the categories such that parameters initially classified as a primary category may be switched to a secondary or tertiary category and vice versa.

The conversion module 212 matches the results between the parameters extracted from the source website and those inherent to the destination website. The conversion module 212 can use the values and/or metadata associated with the source website parameters to convert the style parameters of the destination website to be the respective value or metadata values from the source website. The conversion module 212 can also receive external supplemental data from the user to make additional adjustments. In one aspect, the conversion to the parameters can be ranked based on the classification between the primary, secondary, and tertiary parameters.

The display module 214 can generate an output to yield an intermediate display of the replicated destination site generated from the source data style parameters. In a further aspect, the display module 214 can coordinate with the parsing module to provide primary, secondary or tertiary style parameters that can be adjusted with the supplemental data from the user. The supplemental data received at the display module 214 can be an automatically updated display for the user to confirm the replicated website appearance. In a further aspect, the supplemental data can be fed into the machine learning module and/or stored in a storage device to be recalled for later use.

Figure 3:
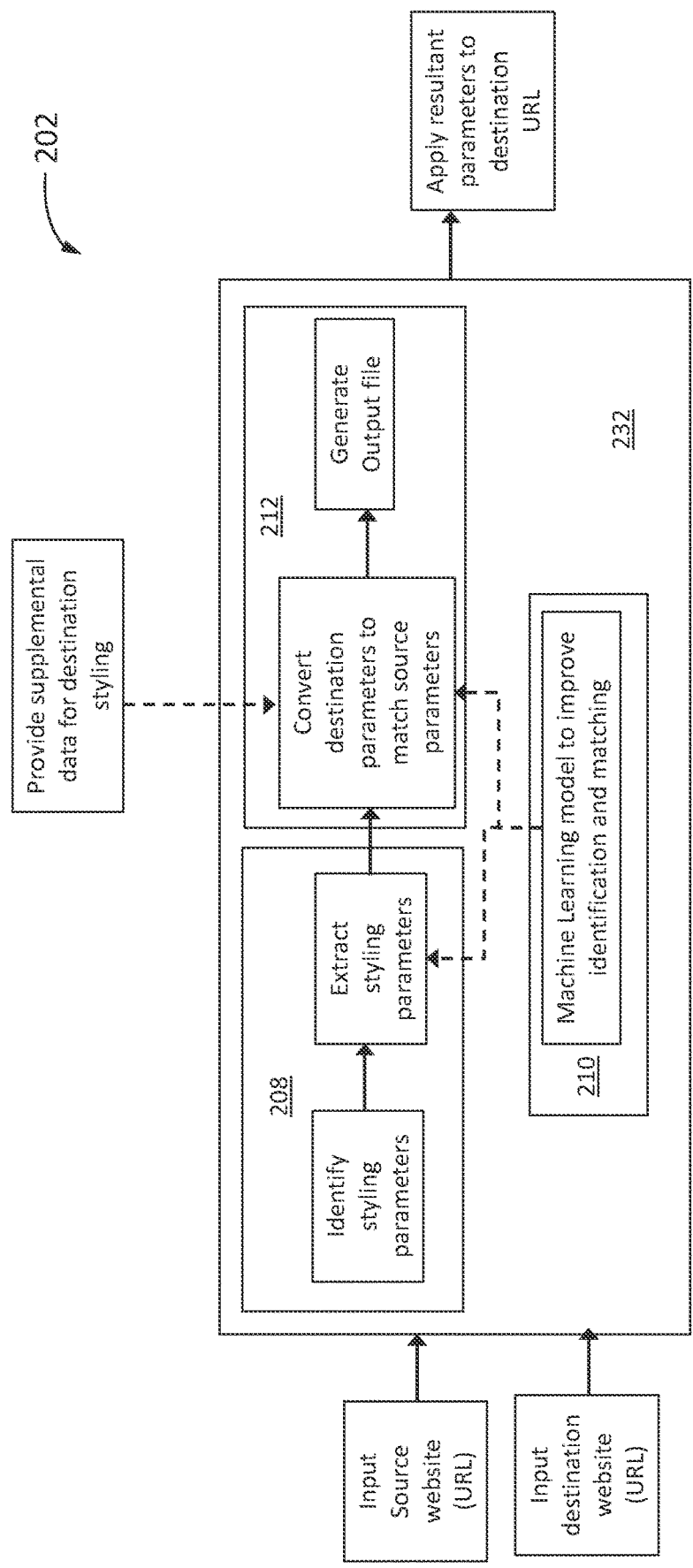
FIG. 3 illustrates a block diagram for the website repli-cating platform with the machine learning model.

As shown in FIG. 3, in an exemplary configuration, the processor 232 running the machine instructions can implement steps along with running a machine learning module 210 to replicate the visual display from a source website to a destination website. As mentioned earlier, these steps can take a heuristic approach to identifying and matching parameters between the source website and destination website. The computing platform 202 can comprise the parsing module 208 and the conversion module 212 can identify analogous parameters between the websites; match the analogous parameters, and replace the parameters of the destination website with the desired style parameters from the source website. The computing platform 202 can also be configured to receive supplemental external data from the user to increase the similarity between the source website and destination website.

As shown, the system can load a website from the source data in the parsing module 208. The source data can be categorized for a further comparison. Identifying the style parameters of the source website helps define the analogous style parameters to be matched and replaced in the destination website. In certain instances, the parameter structure and metadata associated with the style parameters for the source website may not be present with the style parameters associated with the destination website. Thus, the system 202 applies a heuristic approach to develop relationships between the parameters and what impact the parameters have on the visual display, once the source website and destination website parameters are identified and categorized. The relationships between the parameters can be enhanced by the machine learning module 210 which provide additional data for: 1) the algorithm associated with identifying the parameters and 2) the algorithm for matching and replacing the parameters between the websites. The parameter data defined by the processor and the parameter data from the machine learning module can be used to generate a resultant set of parameters. The resultant data set can be used to replace the parameters at the destination website to generate the replicated display of the source data website. In a further aspect, the resultant parameters can be displayed for intermediate review and analysis. The supplemental data can be provided to further enhance the similarity between the source and destination. After the supplemental data has been entered and approved, the resultant parameter data can be exported from the platform as an output file to the URL of the destination website. The parameters can be uploaded to display the replicated source data visual style at the destination website.

Referring back to FIG. 2, in some implementations, computing platform(s) 202, remote platform(s) 204, and/or external resources 228 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 228 may be operatively linked via some other communication media.

A given remote platform 204 may include one or more processors configured to execute computer program modules. The computer program modules may be configured to enable an expert or user associated with the given remote platform 204 to interface with system 200 and/or external resources 228, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 228 may include sources of information outside of system 200, external entities participating with system 200, and/or other resources. In some implementations, some or all of the functionality attributed herein to external resources 228 may be provided by resources included in system 200.

Computing platform(s) 202 may include electronic storage 230, one or more processors 232, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 230 may comprise non-transitory storage media that electronically stores information. The electronic storage media of electronic storage 230 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 230 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 230 may include one or more virtual storage resources (e.g., cloud storage, a virtual private network, and/or other virtual storage resources). Electronic storage 230 may store software algorithms, information determined by processor(s) 232, information received from computing platform(s) 202, information received from remote platform(s) 204, and/or other information that enables computing platform(s) 202 to function as described herein.

Processor(s) 232 may be configured to provide information processing capabilities in computing platform(s) 202. As such, processor(s) 232 may include one or more of a digital processor, an analog processor, a digital circuit designed to process information, an analog circuit designed to process information, a state machine, and/or other mechanisms for electronically processing information. Although processor(s) 232 is shown in FIG. 2 as a single entity, this is for illustrative purposes only. In some implementations, processor(s) 232 may include a plurality of processing units. These processing units may be physically located within the same device, or processor(s) 232 may represent processing functionality of a plurality of devices operating in coordination. Processor(s) 232 may be configured to execute modules 208, 210, 212, 214 and/or other modules. Processor(s) 232 may be configured to execute modules 208, 210, 212, 214 and/or other modules by software; hardware; firmware; some combination of software, hardware, and/or firmware; and/or other mechanisms for configuring processing capabilities on processor(s) 232. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, and/or 214 are illustrated in FIG. 2 as being implemented within a single processing unit, in implementations in which processor(s) 232 includes multiple processing units, one or more of modules 208, 210, 212, and/or 214 may be implemented remotely from the other modules. The description of the functionality provided by the different modules 208, 210, 212, and/or 214 described below is for illustrative purposes, and is not intended to be limiting, as any of modules 208, 210, 212, and/or 214 may provide more or less functionality than is described. For example, one or more of modules 208, 210, 212, and/or 214 may be eliminated, and some or all of its functionality may be provided by other ones of modules 208, 210, 212, and/or 214. As another example, processor(s) 232 may be configured to execute one or more additional modules that may perform some or all of the functionality attributed below to one of modules 208, 210, 212, and/or 214.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 4 illustrates an example flow diagram (e.g., process 400) for replicating a website, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, the process 400 may include receiving a destination website. The user may provide the destination website URL, where the final website will operate. At step 404, the process 400 may include receiving the source website. The source website can be the website that the user desires the destination website to visually resemble. At step 406, the process 400 may include determining a first set of source parameters associated with the source website. In determining the first set of style parameters, the processor can load the source website. The processor can also identify and categorize a hierarchy of style parameters from the source website. At step 408, the process 400 may include extracting the first set of source parameters that were identified and categorized from the source website. At step 410, the process may determine a plurality of destination style parameters associated with the destination website.

In particular, at step 412, the process 400 may include training a machine learning model to perform multiple activities. Training the machine learning model can perform steps to improve a resultant match between the style parameters associated with the destination website and style parameters associated with the source website. The machine learning model can determine a set of model parameters associated with the source website. The machine learning model can generate a resultant parameters based on a comparison between the source parameters and model parameters. The machine learning model can also match the resultant parameters to an associated destination parameter from the plurality of destination parameters. At step 414, the process 400 can replace the associated destination parameters with the resultant parameters.

In an aspect, the process 400 can include generating the resultant set of source parameters by comprising predicting the second set of source data based on stored data. In an aspect, the method can comprise receiving a set of supplemental parameters. The user can provide input if they perceive the visual display of the destination website is not consistent with the source website. In an aspect, the process 400 can include updating the resultant parameters with the supplemental parameters.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for replicating a website, the method comprising:
   receiving a destination website;
   receiving a source website;
   determining a plurality of source parameters associated with the source website;
   extracting the plurality of source parameters associated with the source website;
   determining a plurality of destination parameters associated with the destination website;

training a machine learning model to:

determine a plurality of model parameters associated with the source website;

generate a plurality of resultant parameters based on a comparison between the source parameters and model parameters;

match a resultant parameter of the plurality of resultant parameters to a destination parameter of the plurality of destination parameters; and in response to matching the resultant parameters with an associated destination style parameter, replacing the associated destination parameter with the resultant parameter.

2. The computer-implemented method of claim 1, wherein training the machine model to generate a plurality of resultant parameters comprises predicting the model parameters based on stored data.

3. The computer-implemented method of claim 1, further comprising receiving a set of supplemental style parameters.

4. The computer-implemented method of claim 3, further comprising updating the plurality of resultant parameters with the set of supplemental parameters.

5. The computer-implemented method of claim 3, further comprising updating the machine learning model based on the set of supplemental style parameters and the plurality of resultant parameters.

6. The computer-implemented method of claim 3, further comprising storing the set of supplemental style parameters and the plurality of resultant parameters.

7. The computer-implemented method of claim 1, wherein extracting the plurality of source parameters comprises identifying: primary source data, secondary source data, and tertiary source data.

8. The computer-implemented method of claim 1, further comprising exporting the plurality of resultant parameters to the destination website.

9. The computer-implemented method of claim 1, wherein determining the plurality of source parameters associated with the source website comprises parsing identifiers associated with website style parameters.

10. A system configured for replicating a website, the system comprising:

one or more hardware processors configured by machine-readable instructions to:

receive a destination website;

receive a source website;

determine a plurality of source parameters associated with the source website;

identify a primary source data, secondary source data, and tertiary source data from the plurality of source parameters;

determine a plurality of destination parameters associated with the destination website;

train a machine learning model to:

predict a plurality of model parameters associated with the source website;

generate a plurality of resultant parameters based on a comparison between the plurality of source parameters and the plurality of destination parameters;

match a resultant parameter of the plurality of resultant parameters to a destination parameter of the plurality of destination parameters;

in response to matching the resultant parameters with an associated destination parameter, replace the associated destination style parameter with the resultant parameter; and generate a simulation of the destination website based on the resultant parameters.

11. The system of claim 10, wherein the processors are further configured to receive a set of supplemental parameters.

12. The system of claim 11, wherein the processors are further configured to update the plurality of resultant parameters with the set of supplemental parameters.

13. The system of claim 11, wherein the processors are further configured to export the plurality of resultant parameters to the destination website.

14. The system of claim 11, wherein the processors are configured to determine the plurality of source parameters associated with the source website by parsing identifiers associated with website style parameters.

15. The system of claim 11, wherein the processors are further configured to update the machine learning model based on the supplemental parameters and the resultant parameters.

16. A non-transient computer-readable storage medium having instructions embodied thereon, the instructions being executable by one or more processors to perform a method for replicating a website, the method comprising:

receiving a destination website;

receiving a source website;

determining a plurality of source parameters associated with the source website;

extracting the plurality of source parameters associated with the source;

determining a plurality of destination style parameters associated with the destination website;

training a machine learning model to:

determine a plurality of model parameters associated with the source website;

generate a plurality of resultant parameters based on a comparison between the source parameters and model parameters;

match a resultant parameter of the plurality of resultant parameters to a destination parameter of the plurality of destination style parameters; and in response to matching the resultant parameters with an associated destination style parameter, replacing the associated destination style parameter with the resultant parameter.

17. The computer-implemented instructions of claim 16, wherein the training the machine model to generate the plurality of resultant parameters comprises predicting the model parameters based on stored data.

18. The computer-implemented instructions of claim 16, further comprising receiving a set of supplemental parameters.

19. The computer-implemented instructions of claim 18, further comprising updating the set of resultant parameters with the plurality of supplemental parameters.

20. The computer-implemented instructions of claim 16, wherein extracting the plurality of source parameters comprises identifying: primary source data, secondary source data, and tertiary source data.

* * * * *